(12) United States Patent
Inoue et al.

(10) Patent No.: US 7,765,890 B2
(45) Date of Patent: Aug. 3, 2010

(54) INDUSTRIAL ROBOT

(75) Inventors: Toshihiko Inoue, Yamanashi (JP);
Kazutaka Nakayama, Yamanashi (JP);
Takatoshi Iwayama, Yamanashi (JP);
Junya Fujita, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/139,729

(22) Filed: Jun. 16, 2008

(65) Prior Publication Data
US 2008/0315820 A1  Dec. 25, 2008

(30) Foreign Application Priority Data
Jun. 20, 2007  (JP) .............................. 2007-162889

(51) Int. Cl.
*B25J 17/00* (2006.01)
(52) U.S. Cl. .............. 74/490.02; 74/490.01; 74/490.06; 901/29
(58) Field of Classification Search .............. 74/490.01, 74/490.02, 490.06, 424.5, 490.03; 219/137.9; 318/568.11; 901/19, 23, 29
See application file for complete search history.

(56) References Cited

U.S. PATENT DOCUMENTS

| | | | | |
|---|---|---|---|---|
| 4,828,453 | A * | 5/1989 | Martin et al. .............. | 414/738 |
| 4,868,348 | A * | 9/1989 | Tanabe ...................... | 174/15.7 |
| 5,656,904 | A * | 8/1997 | Lander .................. | 318/568.12 |
| 5,782,133 | A * | 7/1998 | Kullborg ...................... | 74/420 |
| 6,517,460 | B2 * | 2/2003 | Takeuchi et al. ............. | 475/162 |
| 7,202,442 | B2 * | 4/2007 | Nakagiri et al. .......... | 219/137.9 |
| 2004/0149064 | A1 * | 8/2004 | Narita et al. ............. | 74/490.03 |
| 2005/0061097 | A1 * | 3/2005 | Haga et al. .................... | 74/423 |
| 2006/0101936 | A1 | 5/2006 | Inoue et al. | |
| 2007/0031232 | A1 | 2/2007 | Kurebayashi et al. | |
| 2008/0056859 | A1 | 3/2008 | Inoue et al. | |
| 2008/0264195 | A1 * | 10/2008 | Larsson et al. ........... | 74/490.02 |

FOREIGN PATENT DOCUMENTS

EP  1625920 A1  2/2006

(Continued)

OTHER PUBLICATIONS

Machine translation of JP2004-090135.*

(Continued)

*Primary Examiner*—Richard W Ridley
*Assistant Examiner*—Matthew A Johnson
(74) *Attorney, Agent, or Firm*—Lowe Hauptman Ham & Berner, LLP (57) ABSTRACT

An industrial robot has an arm, a wrist element rotatably interconnected to the arm, a work tool mounted on a distal end of the wrist element, and a motor mounted on the wrist element. An umbilical-member connected to the work tool and a flat cable connected to the motor are disposed to run along the wrist element from the arm side to the work tool or to the motor. A pipe member extending in a direction of a rotation axis of the wrist element is provided inside the arm and the umbilical-member connected to the work tool is passed inside the pipe member. The flat cable connected to the motor is wound around outside of the pipe member, with the flat cable arranged to become slack in a rotating direction of the wrist element.

4 Claims, 8 Drawing Sheets

FOREIGN PATENT DOCUMENTS

| | | |
|---|---|---|
| EP | 1741523 A2 | 1/2007 |
| EP | 1892064 A1 | 2/2008 |
| JP | 62287991 A | 12/1987 |
| JP | 02179381 A | 7/1990 |
| JP | 10500470 A | 1/1998 |
| JP | 2004-090135 | 3/2004 |
| JP | 2004138094 A | 5/2004 |
| JP | 2005-096073 | 4/2005 |
| JP | 2007151361 A | 6/2007 |

OTHER PUBLICATIONS

Notice of Reasons for Rejection for JP2007-162889 mailed Nov. 4, 2008.

EP Search Report for 08010982.0 dated Sep. 15, 2008.

\* cited by examiner

INDUSTRIAL ROBOT

CROSS REFERENCE TO RELATED APPLICATION

The present application claims the benefit of priority based on Japanese Patent Application No. 2007-162889, filed on Jun. 20, 2007, disclosure of which is incorporated herein in its entirety by reference.

BACKGROUND OF THE INVENTION

1. Field of the Invention

The present invention relates to an industrial robot in which an umbilical-member connected to a work tool or a motor mounted on a rotatable wrist element is disposed to run along the wrist element from an arm to the tool or the motor.

2. Description of Related Art

When an industrial robot such as a welding robot, a handling robot, or the like, is used to perform welding operation or handling operation, filament bodies such as cables, pipelines, etc., for supplying gas or power, or transmitting signal to the work tool such as a welding torch or a hand mounted to the distal end of a wrist element are required. When these filament bodies are disposed along an arm of the robot or along a wrist element rotatably mounted to the arm, the filament bodies may give rise to interference with the arm or other peripheral equipments, or rotation of the arm or wrist element may produce tension in the filament bodies, resulting in breakage or damage of the filament bodies. In order to eliminate such inconveniences, several proposals have been made, including, for example, Japanese Patent Publication No. 2005-96073 and Japanese Patent Publication No. 2004-90135, which disclose insertion of filament bodies inside the arm or wrist element.

Japanese Patent Publication No. 2005-96073 discloses a processing structure for disposing an umbilical-member, in which, between a wire supply apparatus mounted on an arm and a work tool, the umbilical-member supplied from the wire supply apparatus to the work tool is passed inside the arm and is drawn out from a passing port opened at a trunk portion of the wrist element, and is disposed to run along the wrist element so as to be connected to a welding torch. Within the arm, a motor for driving the wrist, a reduction gear and an intermediate shaft are arranged in a row coaxial with the rotation axis of the wrist element. The umbilical-member is inserted into the hollow cylindrical portion of the intermediate shaft, and is drawn out of the passing port.

Japanese Patent Publication No. 2004-90135 discloses a processing structure for disposing filament bodies in a joint section having one arm rotatably connected to the other arm (wrist element), in which the filament bodies are disposed inside the two arms. A motor and a reduction gear are incorporated in the one arm coaxially with the rotation axis of the other arm. Output shaft of the reduction gear extends into the other arm, and is connected via a linkage plate to the other arm. A flexible tube as an air supply pipe is loosely wound around the outer circumference of the output shaft. Further outside of the flexible tube, a flat cable is wound around via a cylindrical partition plate.

In the method disclosed in Japanese Patent Publication No. 2004-90135, when one arm is rotated in one direction relative to the other arm, the flexible tube and the flat cable are displaced so as to tighten the winding. On the contrary, when one arm is rotated in the opposite direction relative to the other arm, the flexible tube and the flat cable are displaced so as to relax the winding. Thus, the flexible tube and the flat cable permit the rotation range of the arm to be increased without giving rise to twisting or tension in the filament bodies.

Thus, the above-described Japanese Patent Publication No. 2005-96073 and Japanese Patent Publication No. 2004-90135 provide the processing structure for disposing filament bodies, in which filament bodies are passed through the inside of the forearm and are connected to the wire supply apparatus or the work tool. Further, Japanese Patent Publication No. 2004-90135 discloses a processing structure in which a flexible tube and a flat cable are disposed separately in the inner space of one arm. In accordance with the present invention, such a processing structure stabilizes the behavior of the flexible tube and the flat cable, and thereby increases the reliability of connection. However, it is required to achieve a more compact and light-weight arm having a reduction gear incorporated therein in order to further stabilize the behavior of the arm and wrist element of a robot. Thus, although there is still a need for size reduction, there is a limit to size reduction in prior art.

Thus, in the method disclosed in Japanese Patent Publication No. 2005-96073, for example, there is a problem that the wire supply apparatus projects behind the arm. In the method disclosed in Japanese Patent Publication No. 2004-90135, there is a problem that, although a flat cable is used in order to reduce the processing space for the cable, the motor and the reduction gear are arranged in a row coinciding with the rotation axis of the other arm, and therefore, one arm cannot be formed compact in axial direction and the benefit of the flat cable cannot be fully utilized.

SUMMARY OF THE INVENTION

It is an object of the present invention to provide an industrial robot which, by forming a compact space for containment of an umbilical-member, permits an arm to be made in a compact form, and which thereby enables the operational stability of a robot to be improved.

In order to attain the above object, in accordance with one aspect of the present invention, there is provided an industrial robot comprising: an arm; a wrist element rotatably interconnected to the arm; a work tool provided on a distal end of the wrist element; and a motor mounted on the wrist element; wherein a pipe member extending in a direction of a rotation axis of the wrist element is provided inside the arm, an umbilical-member connected to the work tool being passed inside the pipe member, a flat cable connected to the motor being wound around an outer circumference of the pipe member, with the flat cable slacked in a rotating direction of the wrist element; and wherein the umbilical-member connected to the work tool and the flat cable connected to the motor are disposed along the wrist element from the arm side to aid work tool or to the motor.

In accordance with the construction as described above, a pipe member is provided inside the arm, and an umbilical-member connected to the work tool is passed through the interior of the pipe member while a flat cable connected to the motor is wound around the outer circumference of the pipe member so as to have a surplus length, so that interference or entanglement of the umbilical-member with the flat cable which may give rise to twisting or tension in the umbilical-member or the flat cable during the robot operation can be avoided and the behavior of the umbilical-member and the flat cable during the robot operation can be stabilized. Further, since a flat cable is used as an umbilical-member connected to the motor, space for containment of cables can be reduced as compared to the case where a multiplicity of generally round cables are arranged in parallel so as to avoid entanglement. Therefore, the arm can be formed more compact, and the operational stability of a robot can be improved.

In the industrial robot, the flat cable may also be wound in multiple turns in spiral form.

With such construction, when the wrist element is rotated in one direction, the flat cable is relaxed, and when the wrist element is rotated in opposite direction, the flat cable is tightened. By winding the flat cable in multiple turns of spiral form, occurrence of tension in the flat cable can be prevented, and the surplus length of the flat cable can be absorbed and the behavior of the flat cable in association with the rotation of the wrist element can be stabilized. Since the tension or twisting acting upon the flat cable is relaxed, useful life of the flat cable can be increased.

In the industrial robot, the arm comprises: an arm body having a horizontal wall section parallel to the rotation axis of the wrist element and a vertical wall section orthogonal to the rotation axis of the wrist element; a wrist element drive motor fixed to the horizontal wall section orthogonally to the rotation axis of the wrist element for driving the wrist element; and a reduction gear mechanism provided inside the vertical wall section for reducing rotational speed of the wrist element drive motor, the reduction gear mechanism comprising a hypoid pinion interconnected to the rotation axis of the wrist element drive motor, and a hypoid gear which has a through-hole in a center portion for inserting the pipe member and which engages with a distal end of the hypoid pinion to be rotated integrally in one body with the wrist element by a driving force of the wrist element drive motor.

With such construction, the wrist element drive motor fixed to the horizontal wall section of the arm body is disposed orthogonally relative to the rotation axis of the wrist element, and the reduction gear mechanism for transmitting the driving force of the wrist element drive motor to the wrist element has a hypoid gear having a through-hole for insertion of the pipe member in the center portion, so that the wrist element drive motor and the reduction gear mechanism need not be arranged in a row in the direction of the rotation axis of the wrist element as in prior art. In addition, use of a flat cable as an umbilical-member to be connected to the motor mounted on the wrist element exhibits synergistic effect so as to permit the length of arm to be shortened in the direction of the rotation axis of the wrist element, and an open space can be provided on the side opposite to the link of the wrist element to the arm (proximal side of the arm). This space can be utilized as the mounting space for the wire supply apparatus to relay the umbilical-member connected to the work tool. Thus, the arm can be made more compact, and the balance and stability of the robot operation can be improved.

In the industrial robot, the pipe may be integrally fixed to the hypoid gear via a pipe fitting member fixed to the outer circumference of the pipe member, with the flat cable being contained in the containment space formed between the pipe fitting member and inner wall of the arm, with the leading end of the flat cable being drawn out through the space formed between the pipe member and the pipe fitting member toward the wrist element.

With such a construction, the flat cable contained in the cable containment space formed the fitting member and inner wall of the arm is disposed to pass through the space formed between the pipe and the pipe fitting member toward the wrist element, so that the flat cable contained in the cable containment space can be drawn out toward the wrist element without giving rise to interference with filament bodies.

In the industrial robot, a cable inlet port for introducing the flat cable from the exterior into the containment space may be provided on the inner wall of the arm, and a cable outlet port for drawing out the flat cable from the containment space toward the wrist element may be provided on the pipe member, the flat cable being fixed near the cable inlet port and near the cable outlet port, with guide pieces being provided for guiding the introduction and extraction of the flat cable, respectively.

With such a construction, the flat cable is fixed near the cable inlet port and near the cable outlet port of the cable containment space with guide pieces provided for guiding the introduction and extraction, respectively, so that stress concentration in the cable at the two fixation ends of the flat cable which may lead to damages such as breakage of the cable can be avoided.

In the industrial robot, the flat cable for motor may be constructed such that first cables each having a plurality of twisted-pair wires having conductors including a signal line covered with insulator are covered with a sheath and second cables each having a plurality of power conductors covered with insulators are covered with a sheath, and the two sets of cables are arranged in a row with sheathes bonded to each other.

With such a construction, a flat cable can be manufactured easily at low cost by adhering sheathes of a plurality of twisted-pair wires to each other.

BRIEF DESCRIPTION OF THE DRAWINGS

Above and other objects, features and advantages of the present invention will become more apparent from following description of preferred embodiments with reference to drawings, in which.

DETAILED DESCRIPTION

Figure 1A:
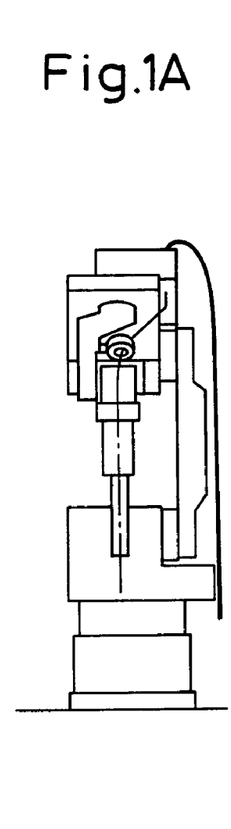
FIG. 1A is a front view of an industrial robot according to a first embodiment of the present invention.
Figure 1B:
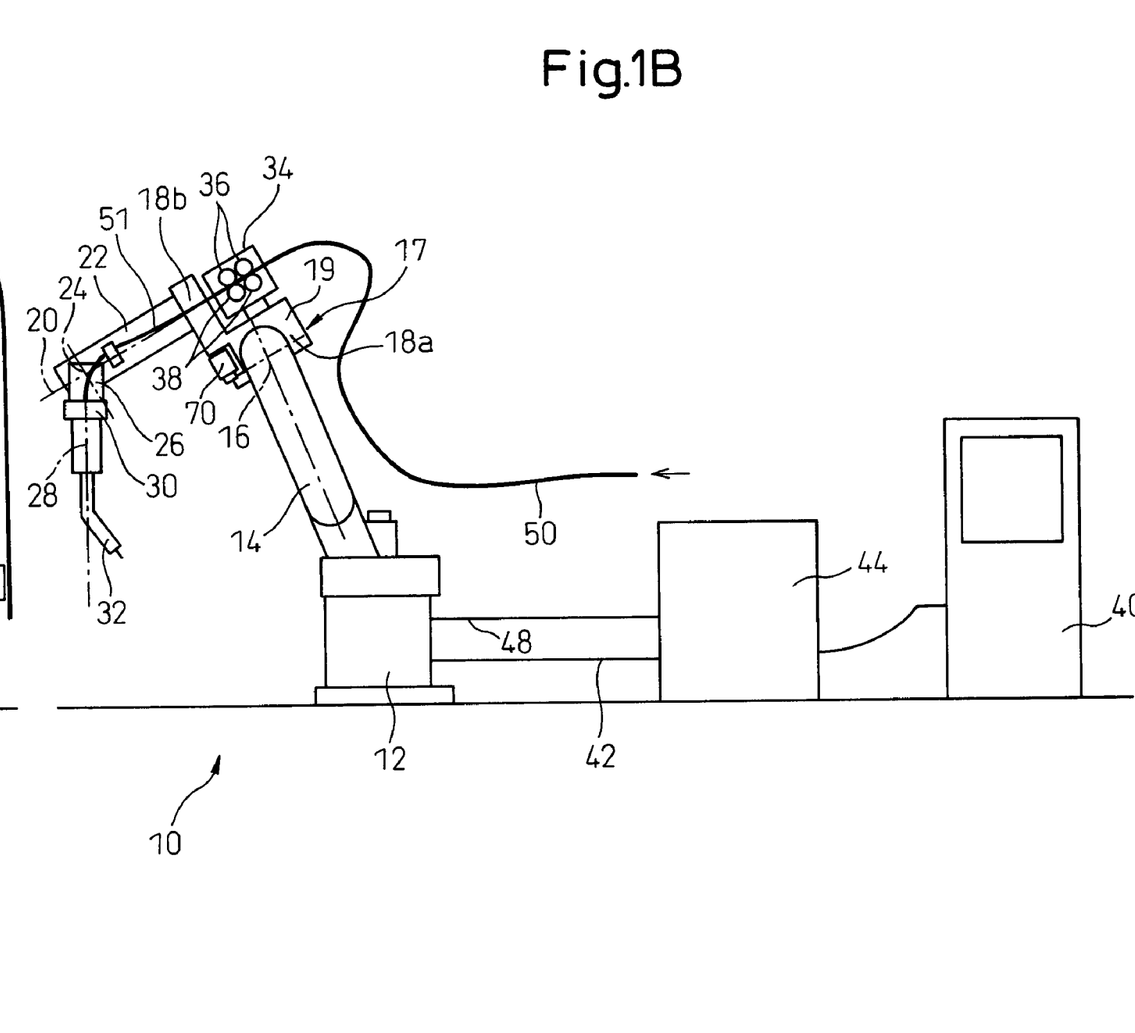
FIG. 1B is a side view of an industrial robot according to a first embodiment of the present invention.
Figure 9A:
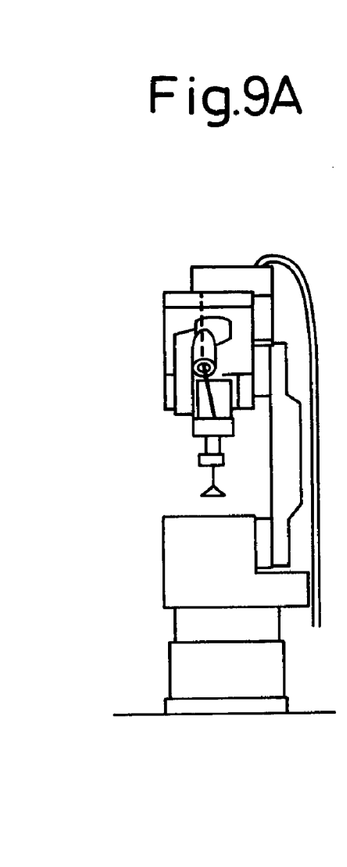
FIG. 9A is a front view of an industrial robot according to a second embodiment of the present invention.
Figure 9B:
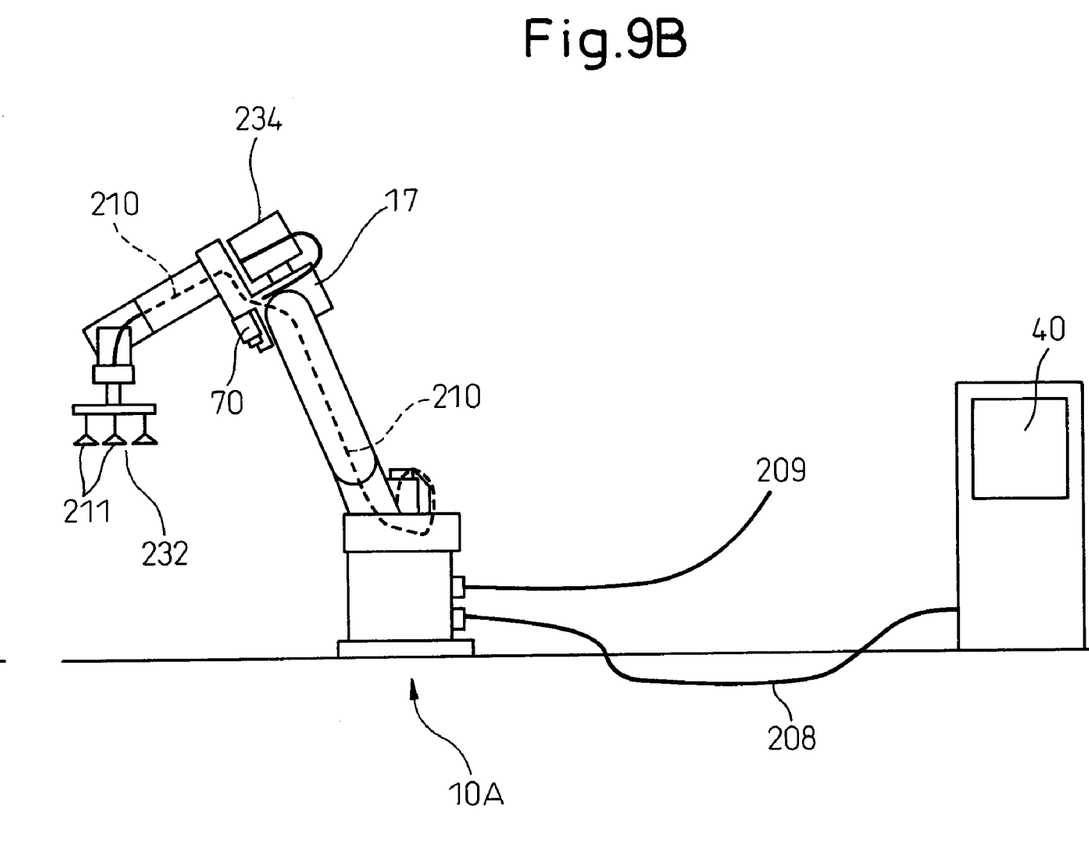
FIG. 9B is a side view of an industrial robot according to a second embodiment of the present invention.

The present invention will be described in detail below with reference to drawings. FIG. 1A and FIG. 1B are a front view and a side view, respectively, showing an industrial robot comprising a welding torch as a work tool according to a first embodiment of the present invention. FIG. 9A and FIG. 9B are a front view and a side view, respectively, showing an industrial robot comprising a hand tool in place of a welding torch as a work tool according to a second embodiment of the present invention. In FIGS. 1A and 1B and FIGS. 9A and 9B, an umbilical-member which is relayed by a wire supply apparatus and is connected to a work tool, is inserted through a pipe member (see FIG. 2, etc.) provided in the inner space of the forearm (corresponding to "arm" as referred to in claims), and a flat cable of specified width to be connected to a motor mounted on a first wrist element is wound in multiple turns in spiral form around the outer circumference of the pipe member.

For the purpose of the present embodiment, in order to distinguish the umbilical-member connected to a work tool from a flat cable connected to a motor, an umbilical-member will be referred to as a torch cable. As described later, the torch cable binds a power cable and a gas tube collectively as one bundle.

Robot 10 as shown in FIGS. 1A and 1B is a welding robot having six-axes degrees of freedom, and comprises base 12, upper arm 14 provided on base 12, forearm 17 connected to the distal end of upper arm 14 rotatably about first axis 16 generally orthogonal to the longitudinal direction of upper arm 14, first wrist element (corresponding to "wrist element" as referred to in claims) 22 connected to the distal end of forearm 17 rotatably about second axis 20 generally coinciding with the longitudinal direction of forearm 17, second wrist element 26 connected to the distal end of first wrist element 22 rotatably about third axis 24 generally orthogonal to second axis 20, and third wrist element 30 connected to the distal end of second wrist element 26 rotatably about fourth axis 28 generally coinciding with the longitudinal direction of second wrist element 26.

Welding torch 32 is mounted to the distal end of third wrist element 30. Further, wire supply apparatus 34 for supplying welding wire 50 or the like to welding torch 32 is fixed to horizontal wall section 18a of forearm 17 in the shape of L as viewed in the side view without projecting to the surrounding of forearm 17. Wire supply apparatus 34 comprises driving roller 36 and driven roller 38, and is constructed such that, with one or more sets of rollers sandwiching the welding wire, driving roller 36 is driven by a motor (not shown) for wire supply apparatus so as to feed welding wire 50 or the like. With such construction, stability of the robot attitude is increased, and interference with surroundings during the robot operation can be avoided.

Robot controller 40 sends commands via robot control cable 42 to arc welding robot 10, and controls the servo motors (not shown) mounted to each driving section of the six axes of the robot to alter the position and attitude of welding torch 32 so as to be able to weld specified parts. Welding current to be supplied to welding torch 32 is supplied by welding power source 44 via a power supply cable. Robot controller 40 also controls welding power source 44 simultaneously with operating command sent to servo motors of robot 10. Thus, welding torch 32 can perform welding in accordance with the specified welding condition in synchronism with the operation of robot 10. Robot controller 40 also sends signal and power to wire supply apparatus 34 for controlling wire supply apparatus 34 via wire supply apparatus control cable 48 connecting welding power source 44 to wire supply apparatus 34.

A power cable for supplying welding current to welding torch 32, an air tube for supplying assist gas, and welding wire 50 are connected to welding torch 32, via wire supply apparatus 34. Further, a cooling water tube (not shown) for cooling welding torch 32 may be connected to welding torch 32.

Welding current supplied to welding torch 32 is supplied from welding power source 44 via a power cable in torch cable 51. Assist gas is supplied from a gas cylinder or the like via an air tube in torch cable 51. Welding wire 50 is supplied from a welding wire drum or a welding wire reel as the source of welding wire 50 via a liner in torch cable 51.

A power supply cable, a gas hose, wire supply apparatus control cable 48, and the like connected to wire supply apparatus 34 are drawn into base 12 of the robot via a connector in a switchboard of base 12 of the robot. The power supply cable, gas hose, wire supply apparatus control cable 48, and the like drawn into base 12 are bound into a bundle as torch cable 51, are passed through the hollow space concentric with the rotation axis of base (swivel trunk) 12, and are drawn out above base 12. Torch cable 51 which is drawn out above base 12 is directed along the longitudinal direction of upper arm 14 from lower portion of upper arm 14 to the upper portion of upper arm 14, and to forearm 17. Torch cable 51 is further directed to the side of forearm 17. Wire supply apparatus control cable 48 is connected via a connector to the motor control cable of wire supply apparatus 34, and the power supply cable and the gas hose are directed as they are to wire supply apparatus 34. The power supply cable and the gas hose together with welding wire 50 are inserted through the inner space of forearm 17, and are connected to welding torch 32.

Figure 2:
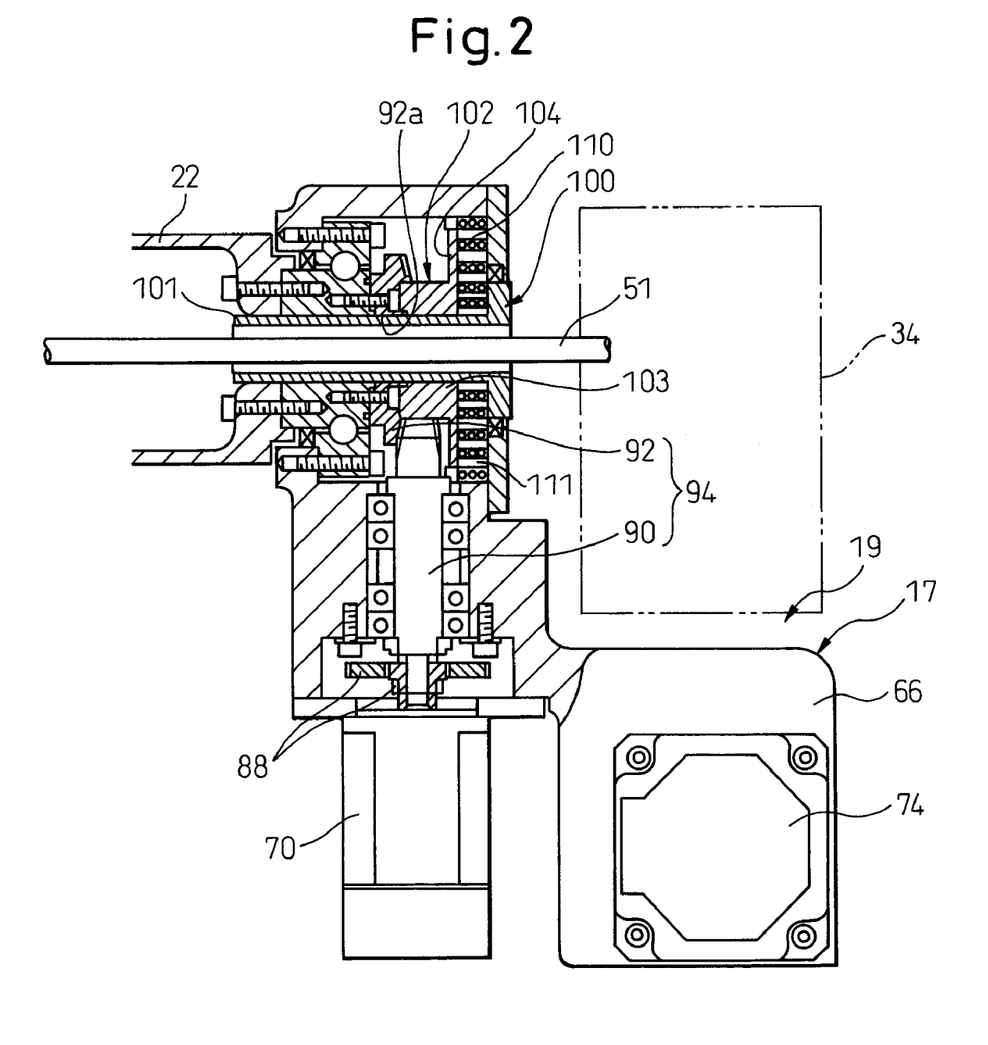
FIG. 2 is a sectional view of the internal structure of the forearm of the robot shown in FIGS. 1A and 1B.

Next, the structure of forearm 17 will be described in detail. As shown in FIG. 2, forearm 17 comprises an arm body 19 having a horizontal wall section 18a parallel to rotation axis 20 of first wrist element 22 and vertical wall section 18b orthogonal to rotation axis 20 of first wrist element 22 (FIG. 1B), wrist element drive motor 70 fixed to horizontal wall section 18a orthogonally to rotation axis 20 of first wrist element 22 for driving first wrist element 22, and reduction gear mechanism 94 provided on the inside of vertical wall section 18b for reducing the rotational speed of wrist element drive motor 70. Reduction gear mechanism 94 comprises hypoid pinion 90 interconnected to the rotation axis of wrist element drive motor 70, and hypoid gear 92 which has through-hole 92a for inserting pipe member 100 in the center portion, and which engages with the distal end of hypoid pinion 90 to be rotated integrally in one unit with first wrist element 22 by the driving force of wrist element drive motor 70.

Wrist element drive motor 70 is disposed with its rotation axis orthogonal to second axis 20 and at a position shifted in the longitudinal direction of forearm 17 to the side of the distal end of forearm 17, that is, to the side of the wrist. By providing wrist element drive motor 70 at this position, a space can be formed on the proximal side of forearm 17 for fixing wire supply apparatus 34 without projecting outward.

The driving force of wrist element drive motor 70 is transmitted via reduction gear mechanism 94 to first wrist element 22. The driving force of wrist element drive motor 70 is transmitted via a set of spar gear or helical gear 88 and hypoid pinion 90 to hypoid gear 92 to rotate first wrist element 22 fixed to hypoid gear 92. Hypoid gear 92 is disposed coaxially with second axis 20 and has through-hole 92a formed in the center portion thereof. Pipe member 100 for passing torch cable 51 to be connected to welding torch 32 is inserted into through-hole 92a. Thus, the driving system consisting of wrist element drive motor 70 and reduction gear mechanism 94 is adapted to achieve a large speed reduction ratio with a set of spar gear or helical gear and a set of hypoid 94.

Pipe member 100 is composed of pipe body 101 and pipe fitting member 102 partially fitting to pipe body 101 on the outside. Pipe body 101 is formed larger than the wall thickness of vertical wall section 18b of forearm 17 (FIG. 1B), and is inserted from the rear side to the front side of vertical wall section 18b through through-hole 92a of hypoid gear 92. Pipe fitting member 102 has tubular section 103 and brim section 104 projecting radially outward at the rear end of tubular section 103. Pipe fitting member 102 has the front end of tubular section 104 integrally fixed in one body to the rear side of hypoid gear 92 to thereby rotate pipe member 100 together with hypoid gear 92.

Brim section 104 of pipe fitting member 102 is disposed in opposition to the rear wall of forearm 17 at a specified separation. The space between brim section 104 and the rear wall of forearm 17 constitutes a cable containment space for containing flat cable 110 connected to an unshown motor mounted on the first wrist element for driving second and third wrist elements 26, 30.

Figure 8:
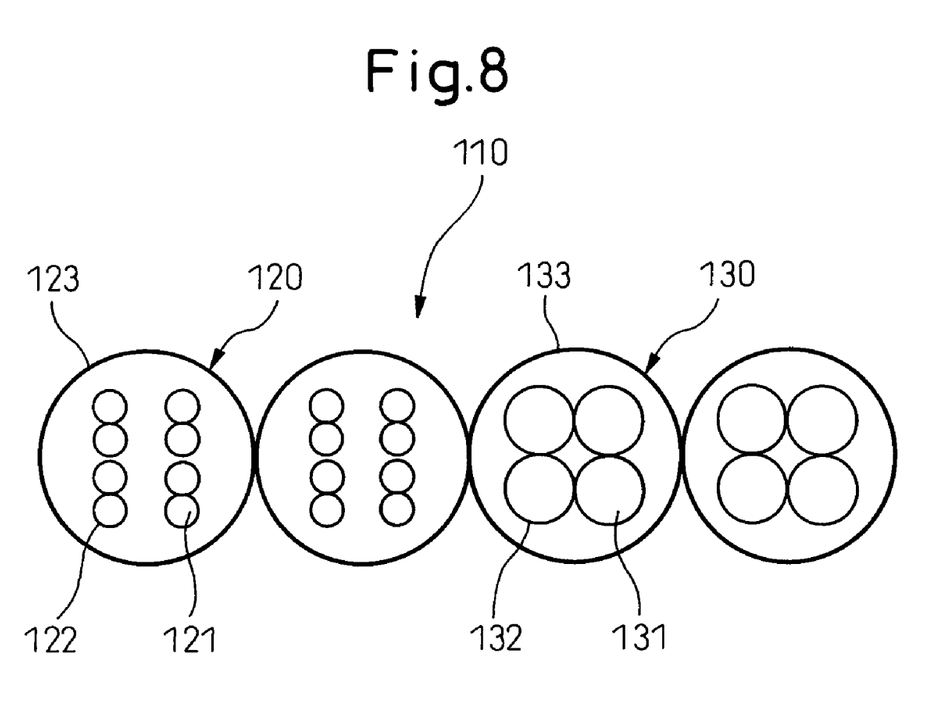
FIG. 8 is a sectional view of a flat cable.

As shown in FIG. 8, the flat cable may be composed of two signal cables 120 each binding with sheath 123 four twisted pairs of signal conductors 121 each covered with insulator 122, and two power cables 130 each binding with sheath 133 four power conductors 131 each covered with insulator 132, with two sets of cables arranged in a row with sheathes 123, 133 adhered to each other. The construction of flat cable 110 is arbitrary, and it may be composed of three cables as shown in FIG. 2, for example. The twisted pairs of signal conductors 123 are arranged separately from power conductors 130 in order to improve anti-noise capability.

Figure 3:
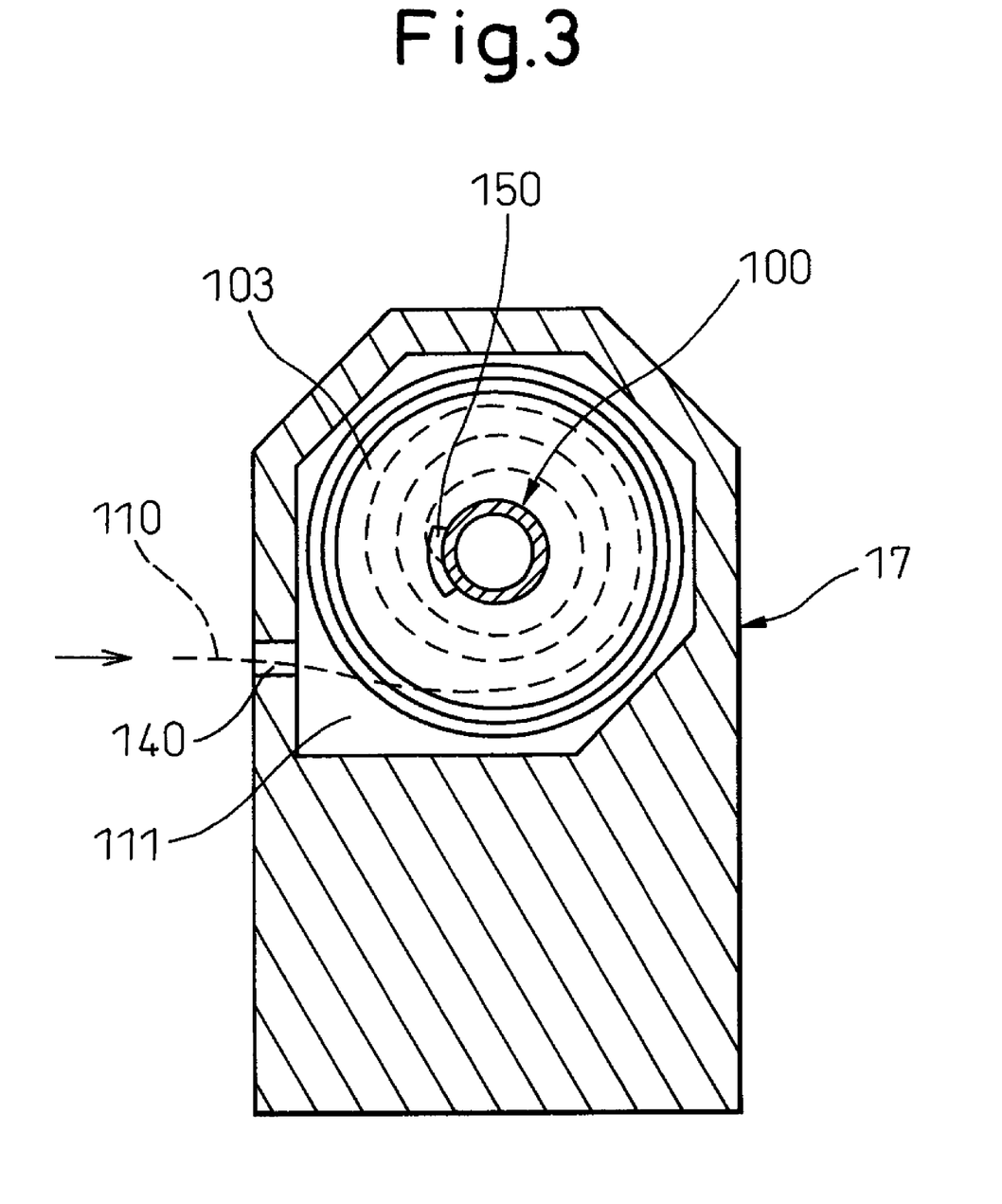
FIG. 3 is a sectional view of a flat cable wound around in spiral form in a cable containment space inside the forearm.
Figure 4:
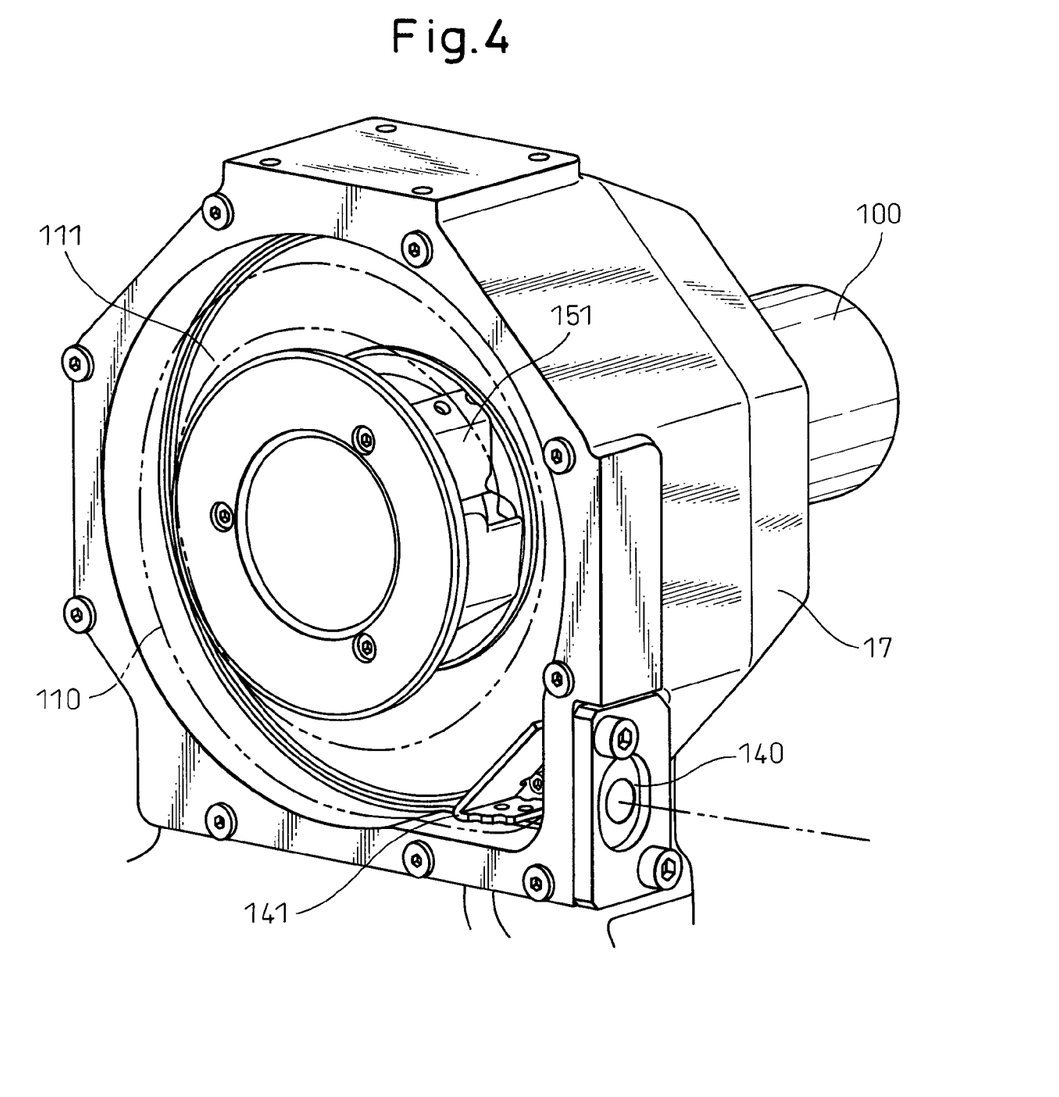
FIG. 4 is a perspective view of the inner space of the forearm having the flat cable wound around in spiral form.
Figure 5:
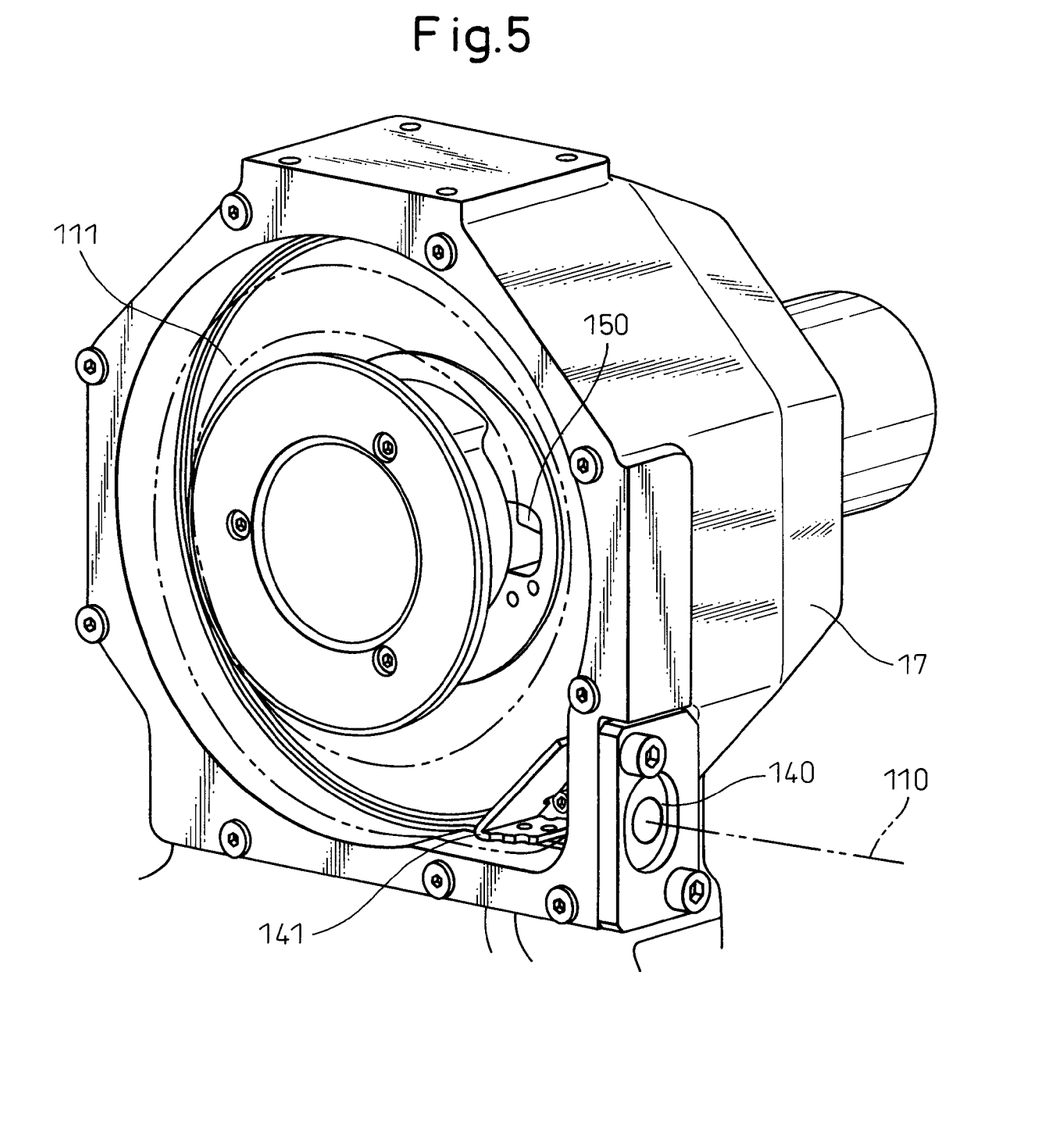
FIG. 5 is a perspective view of the same inner space of the forearm having the flat cable wound around in spiral form with the guide piece at the cable outlet port removed.

As shown in FIGS. 3 to 5, flat cable 110 contained in cable containment space 111 is wound around with a surplus length in the rotating direction of wrist element 22. Thus, flat cable 110 is contained in multiple turns wound in spiral form about rotation axis 20 of first wrist element 22. With such construction, when wrist element 22 is rotated in one direction (for example, 180° in clockwise direction), flat cable 110 is relaxed, and when wrist element 22 is rotated in opposite direction (for example, 180° in counter-clockwise direction), the flat cable is tightened, so that the surplus length can be absorbed and occurrence of tension in flat cable 110 can be prevented.

Figure 6A:
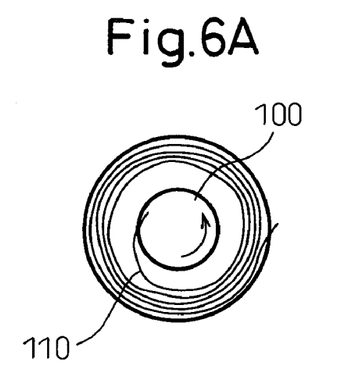
FIG. 6A is a view explaining the rotation of the wrist element in one direction from the state in which the flat cable is wound around in spiral form in the cable containment space inside the forearm.
Figure 6B:
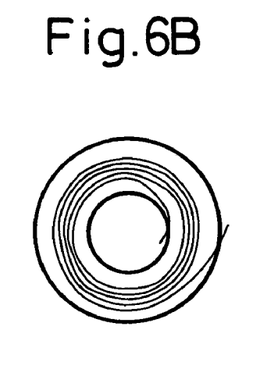
FIG. 6B is a view explaining the neutral state of the wrist element in which the flat cable is wound around in spiral form in the cable containment space inside the forearm.
Figure 6C:
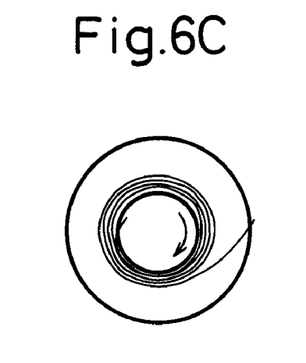
FIG. 6C is a view for explaining the rotation of the wrist element in the other direction from the state in which the flat cable is wound around in spiral form in the cable containment space inside the forearm.

FIGS. 6A to 6C show flat cable 110 contained in multiple turns wound in spiral form. FIG. 6A shows flat cable 110 in relaxed state due to the rotation of the wrist element in one direction from the neutral state shown in FIG. 6B. FIG. 6C shows flat cable 110 in tightened state due to the rotation of the wrist element in the opposite direction from the neutral state shown in FIG. 6B. The surplus length of flat cable 110 is set to a prescribed length taking the movable range of rotating wrist element 22 into account.

Figure 7A:
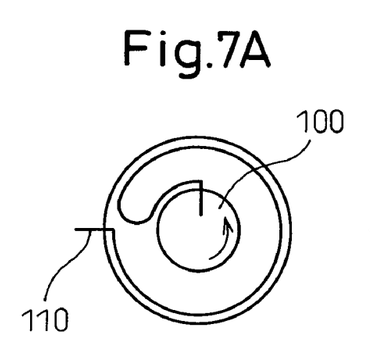
FIG. 7A is a view explaining the rotation of the wrist element in one direction from the state in which the flat cable is contained in a U-shape in the cable containment space inside the forearm.
Figure 7B:
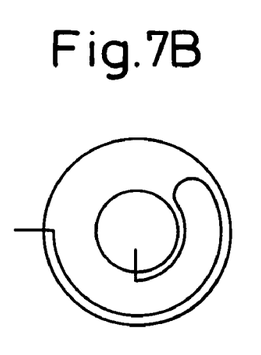
FIG. 7B is a view explaining the neutral state of the wrist element in which the flat cable is contained in a U-shape in the cable containment space inside the forearm.
Figure 7C:
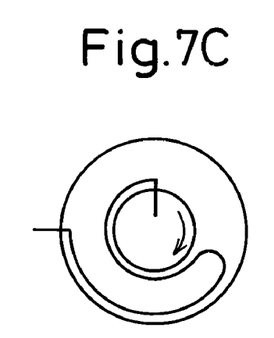
FIG. 7C is a view explaining the rotation of the wrist element in the other direction from the state in which the flat cable is contained in a U-shape in the cable containment space inside the forearm.

FIGS. 7A to 7C show flat cable 110 contained in cable containment space 111, not in multiple turns wound in spiral form, but processed in a folded-back U-shape. In this case, since R in the U-shaped portion is small, the useful life of the cable may be limited as compared to the spiral form, but the behavior of the cable is stable and it is possible to achieve stable cable processing in a minimum space.

Cable inlet port 140 for introducing flat cable 110 from outside into cable containment space 111 is provided on the wall section of forearm 17, and cable outlet port 150 for drawing-out flat cable 110 from cable containment space 111 to the wrist element side is formed in pipe member 100. Near cable inlet port 140 and near cable outlet port 150, respectively, guide pieces 141, 151 are provided for fixing flat cable 110 and guiding the introduction and extraction of flat cable 110. Thus, flat cable 110 is fixed at two fixation ends along guide pieces 141, 151 so that concentration of stress to flat cable 110 at the fixation points can be avoided, and occurrence of damages such as breakage of wires etc., can be prevented.

As shown in FIG. 4 and FIG. 5, flat cable 110 drawn out from cable outlet port 150 is passed through space 150 formed between pipe body 101 and pipe fitting member 102, and is drawn out to the side of first wrist element 22. With such construction, interference of flat cable 110 contained in cable containment space 111 with torch cable 51 is prevented.

Next, an industrial robot according to a second embodiment of the present invention will be described with reference to FIGS. 9A, B. As compared to FIGS. 1A, B, wire supply apparatus 34 is replaced by electromagnetic valve box 234 incorporating an electromagnetic valve, and welding torch 32 is replaced by hand 232. Accordingly, air supply tube 209 and a signal cable are connected to electromagnetic valve box 234, and cable 210 for hand which binds air supply tube 209 and the signal cable and the like is connected between hand 232 and electromagnetic valve box 234.

Robot controller 40 controls the electromagnetic valve via a signal cable, with the electromagnetic valve supplying air to hand 232 in accordance with the signal. Suction pad 211 is mounted on hand 232, and can be driven by the supply air so as to attract a work piece to be handled. An air gripper may be provided in place of suction pad 211, and various other work tools may be used depending on the applications.

As in the first embodiment, in the same manner as torch cable 51 in FIGS. 1A, B, cable 210 for hand is also passed through the inside of base 12 of the robot, through upper arm 14, and, after a part of the cable is relayed by electromagnetic box 234, is passed through the inside of forearm 17 and connected to suction pad 211. The construction of forearm 17 comprising arm body 19, wrist element drive motor 70 and reduction gear mechanism 94 is also same as in the first embodiment. Flat cable 110 which is connected to the motor mounted on the first wrist element for driving the second and third wrist elements is also, as in the first embodiment, wound in spiral form around the outer circumference of pipe member 100 provided in the inner space of forearm 17, and after being passed through space 150 of pipe body 101 and pipe fitting member 102, is drawn out to the side of the wrist element. With such construction, entanglement of cable 210 for hand to be connected to suction pad 211 and flat cable 210 to be connected to the motor can be eliminated, and reliability of the cable connection can be ensured.

With the construction as described above, in industrial robot 10, 10A which can pass umbilical-member 51, 210 through the interior of forearm 17 so as to connect it to a work tool, flat cable 110 which is connected to the motor mounted on the wrist element can be disposed in the space outside pipe member 100 of forearm 17 so as to avoid interference with umbilical-member 51, 210 for a work tool and to stabilize the behavior of the cable, so that flat cable 110 is not subjected to an excessive force, and the effect of the processing space for the flat cable on the position for mounting work tool managing apparatus 32, 232 can be reduced to a minimum.

The present invention is not limited to above-described embodiments, but can be implemented in various modifications without departing from the scope and spirit of the invention. For example, although flat cable 110 is used as an umbilical-member to be connected to a motor mounted on the wrist element in the present embodiment, it is also possible to use a flat cable 110 only in the portion contained in spiral form or in U-shape in cable containment space 111 in the interior of forearm 17 and to use an ordinary cable in the other portion.

The invention claimed is:

1. An industrial robot comprising:

an arm;

a wrist element rotatably interconnected to said arm;

a work tool provided on a distal end of said wrist element; and a motor mounted on said wrist element;

wherein a pipe member extending in a direction of a rotation axis of said wrist element is provided inside said arm, an umbilical-member connected to said work tool being passed inside said pipe member and disposed linearly and coaxially through an entire length of the pipe in a manner wherein coiling of the umbilical-member within the pipe is absent, a flat cable connected to said motor being wound around an outer circumference of said pipe member, with said flat cable becoming slack in a rotating direction of said wrist element;

wherein said umbilical-member connected to said work tool and said flat cable connected to said motor are disposed along said wrist element from said arm side to aid work tool or to said motor, and wherein said arm comprises:

an arm body having a horizontal wall section parallel to said rotation axis of said wrist element and a vertical wall section orthogonal to said rotation axis of said wrist element;

a wrist element drive motor having a rotation axis and fixed to said horizontal wall section orthogonally to said rotation axis of said wrist element for driving said wrist element; and a reduction gear mechanism provided inside said vertical wall section for reducing rotational speed of said wrist element drive motor, said reduction gear mechanism comprising a hypoid pinion interconnected to said rotation axis of said wrist element drive motor, and a hypoid gear which has a through-hole in a center portion for inserting said pipe member and which engages with a distal end of said hypoid pinion to be rotated integrally in one body with said wrist element by a driving force of said wrist element drive motor;

wherein said pipe member is fixed to said hypoid gear via a pipe fitting member fixed to said outer circumference of said pipe member integrally in one body; and wherein a part of said flat cable is contained in a containment space formed between said pipe fitting member and an inner wall of said arm, an extraction end of said flat cable being passed through a space formed between said pipe member and said pipe fitting member, and drawn out to a side of said wrist element.

2. An industrial robot according to claim 1, wherein said flat cable is wound around about said rotation axis of said wrist element in multiple turns in spiral form.

3. An industrial robot according to claim 1, wherein a cable inlet port for introducing said flat cable from outside into said containment space is provided in said inner wall of said arm, and a cable outlet port for extracting said flat cable from said containment space to said side of said wrist element is provided in said pipe member, and wherein guide pieces are provided near said cable inlet port and said cable outlet port, respectively, for fixing said flat cable and guiding an introduction and an extraction of said flat cable.

4. An industrial robot according to claim 1, wherein said flat cable is one in which first cables covered with a sheath, each of said first cables having a plurality of twisted-pair wires having conductors including signal line covered with insulator, and second cables covered with a sheath, each of said second cables having a plurality of power conductors covered with insulators, are arranged in a row with said sheathes bonded to each other.

* * * * *